Patented Nov. 14, 1939

2,179,920

UNITED STATES PATENT OFFICE 2,179,920

COMPOUNDS OF THE PERYLENE SERIES

Erich Clar, Herrnskretschen-on-the-Elbe, Czechoslovakia, assignor to E. I. du Pont de Nemours & Company, Wilmington, Del., a corporation of Delaware No Drawing. Application August 31, 1938, Serial No. 227,693

3 Claims. (Cl. 260—335)

This invention relates to the preparation of new dyestuffs and dyestuff intermediates of the perylene series.

It is known that 1(beta-naphthoxy)-anthraquinone can be converted to benzo-coeroxonium salts by means of dehydrating agents such as sulfuric acid of 60 to 80%. (See Berichte 39, 2245; Annalen 348, 233; and German Patent 186,882 of 1906.) I have now found that 1(beta-naphthoxy)-anthraquinone may be converted to new and valuable dye intermediates and dyestuffs by effecting dehydration and condensation by fusing the same with aluminum chloride in the presence of a flux such as sodium chloride. By this condensation, it appears that there is first formed, at least transitorily, the 3-hydroxy-12,Bz-1-oxydo-1:2-benzperylene, which is then converted into the 12,Bz-1-oxydo-1:2-benzperylene and 12,Bz-1-oxydo-1:2-benzperylene- 3 : 10 -quinone. Where the reaction is carried out by the introduction of an oxidizing agent, including air, the 12,Bz-1-oxydo-1:2-benzperylene is converted directly to the 3:10-quinone in the reaction mass. The reaction is illustrated as follows:

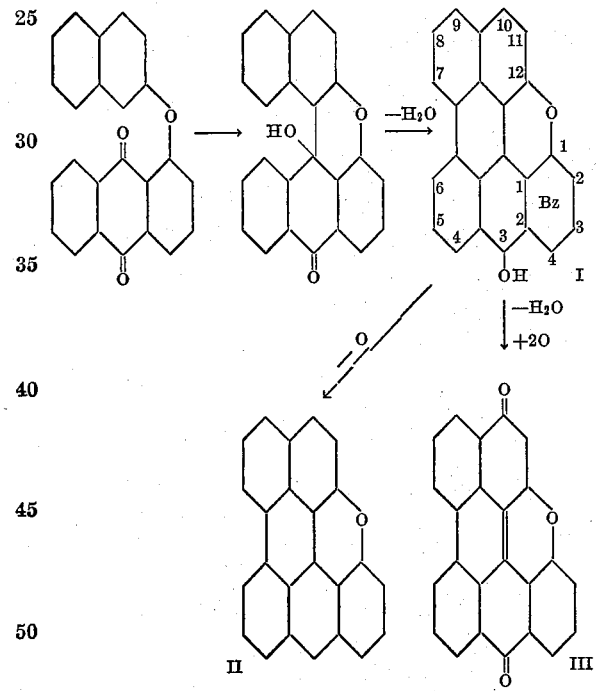

I. 3-hydroxy-12,Bz-1-oxydo-1:2-benzperylene
II. 12,Bz-1-oxydo-1:2-benzperylene
III. 12,Bz-1-oxydo-1:2-benzperylene - 3:10 - quinone It is, therefore, an object of this invention to prepare new dyestuffs and dyestuff intermediates of the perylene series, and to further advance the art in preparing new compounds of the perylene group which may be used for dyestuffs and as intermediates in the preparation of dyestuffs.

The following examples are given to illustrate the invention. The parts used are by weight.

Example 1

60 parts of powdered aluminum chloride, 12 parts of fused sodium chloride and 12 parts of 1(beta-naphthoxy)-anthraquinone are fused at 140° C. under agitation and then brought to a temperature of 200° C. over a period of 1½ hours. The mass is maintained at this temperature under agitation for ½ hour. The color of the mass changes from brown when first fused to grey to red. The fused mass is then decomposed by drowning in dilute hydrochloric acid, filtered and the residue thoroughly washed acid free with hot water. The resulting mass is subjected to a vatting process with alkaline hydrosulfite, whereby the 12,Bz-1 - oxydo - 1:2 - benzperylene-3:10-quinone goes into solution giving a green colored vat. This solution is separated from the residue by filtration. The 12,Bz - 1 - oxydo - 1:2-benzperylene-3:10-quinone is then isolated from the filtrate by air blowing and filtering. When dry, it is a dark brown solid. This product is not readily soluble in nitrobenzene and crystallizes out of this solvent in small dark brown crystals which dissolve in concentrated sulfuric acid with a violet red color exhibiting a red fluorescence. It dyes cotton from a green alkaline hydrosulfite vat in green shades which on oxidation in air change to a pure brown. It may be partially sublimed in vacuum and in a current of carbon dioxide to give dark brown needles. The color as precipitated from the sulfuric acid may be treated with alkali hypochlorite to give somewhat purer colors than are obtained from the crude product.

Alternatively, the fusion mass after acidification and filtering may be washed with water and dried. This dried product is then dissolved in concentrated sulfuric acid, precipitated with water, filtered, washed, and is then vatted out of the mass in this finely divided state. The vatting then proceeds more rapidly and completely.

Example 2

The aluminum chloride-sodium chloride fusion residue which remains after filtering off the vat soluble material is dried and extracted with boiling xylene. The violet red xylene solution is concentrated to crystallize out the 12,Bz-1-oxydo-1:2-benzperylene. This product may be further purified by subliming in vacuum or in a current of carbon dioxide at about 280° C., and then recrystallizing the blue sublimate from xylene. The 12,Bz-1-oxydo-1:2-benzperylene is thus obtained in the form of small flakes which exhibit a coppery luster and which are blue in transmitted light. It melts in an evacuated melting point tube at 280 to 281° C. and dissolves in concentrated sulfuric acid with an orange red color which exhibits a yellow fluorescence. This 12,Bz-1-oxydo-1:2-benzperylene is very reactive and is readily oxidized when dissolved in xylene or glacial acetic acid in the light in the presence of air, to the 12,Bz-1-oxydo-1:2-benzperylene-3:10-quinone. The 12,Bz-1-oxydo-1:2-benzperylene like perylene adds substances with reactive double bonds such as maleic anhydride (diene synthesis, Berichte 65: 856 (1932)).

The 12,Bz-1-oxydo-1:2-benzperylene may be oxidized with theoretical quantities of chromic acid in boiling glacial acetic acid or in a suspension in sulfuric acid to the 12,Bz-1-oxydo-1:2-benzperylene-3:10-quinone.

Where air is added during the aluminum chloride-sodium chloride fusion with efficient agitation, the 12,Bz-1-oxydo-1:2-benzperylene is converted directly to the 12,Bz-1-oxydo-1:2-benzperylene-3:10-quinone.

I claim:

1. The compounds of the class consisting of 12,Bz-1-oxydo-1:2-benzperylene and 12,Bz-1-oxydo-1:2-benzperylene-3:10-quinone.

2. 12,Bz-1-oxydo-1:2-benzperylene.

3. 12,Bz-1-oxydo-1:2-benzperylene-3:10-quinone.

ERICH CLAR.